United States Patent [19]

Sing

[11] Patent Number: 4,641,433
[45] Date of Patent: Feb. 10, 1987

[54] FASTENING SYSTEM

[76] Inventor: Peter Sing, 168-10 84th Ave., Jamaica Hil, N.Y. 11432

[21] Appl. No.: 813,063

[22] Filed: Dec. 24, 1985

[51] Int. Cl.⁴ .............................................. G01B 3/10
[52] U.S. Cl. ..................................... 33/137 R; 33/347
[58] Field of Search ..................... 33/137 R, 138, 347, 33/370, 371; 428/354, 343

[56] References Cited

U.S. PATENT DOCUMENTS

| | | | |
|---|---|---|---|
| 2,711,030 | 6/1955 | Drew et al. | 33/137 R |
| 3,204,339 | 9/1965 | Jorde | 33/137 R |
| 3,648,835 | 3/1972 | Yucel | 33/137 R |
| 4,228,982 | 10/1980 | Sellera | 33/370 |
| 4,353,167 | 10/1982 | Martin | 33/137 R |

Primary Examiner—Willis Little

[57] ABSTRACT

A fastening system in one embodiment comprising a support member and a plurality of leaves stacked together and affixed to the support member. At least a portion of one side of each leaf is covered with an adhesive material. A connecting member having a first free end has its second affixed to the support member. Means are also provided for affixing the first free end of the connecting member to an elongate member.

Another embodiment of the present fastening system comprises a suction cup, a connecting member having a first free end and whose second end is affixed to the suction cup, and means for affixing the first free end of the connecting member to an elongate member.

15 Claims, 11 Drawing Figures

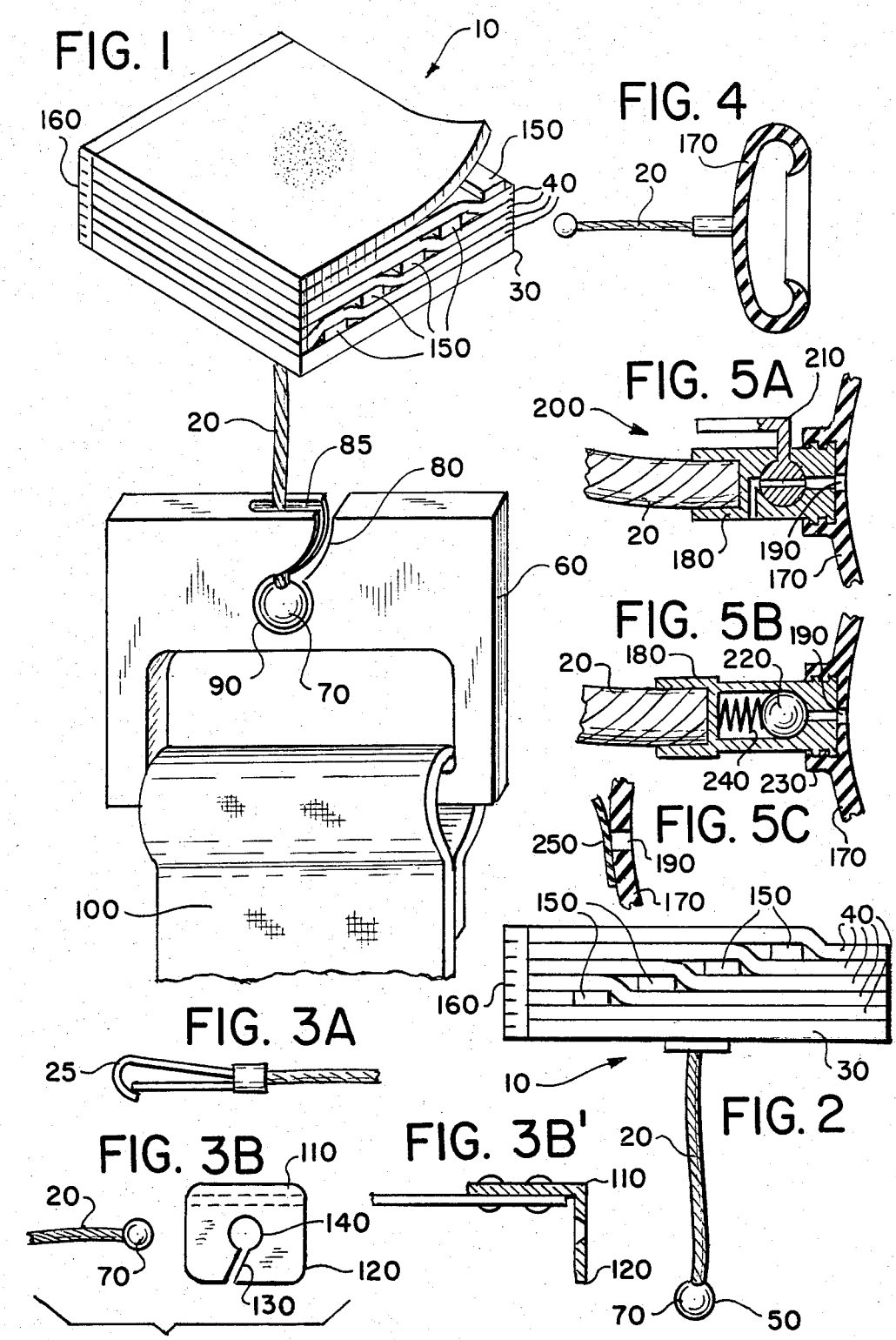

FASTENING SYSTEM

BACKGROUND OF THE INVENTION

This invention relates to aids for using measuring devices, and more particularly to aids to using measuring tapes, surveyor's lines and similar items.

Measuring tapes are in quite common use. Typically, they consist of a relatively long, narrow ribbon that can be coiled within a case. One end of the ribbon is usually secured to a take-up spool within the case and the other free end usually has a pull tab to facilitate pulling the tape out and securing it to a point from which a measurement will be taken. The tape also usually has graduations which allow the user to readily assess the precise length of tape that has been uncoiled.

In one embodiment of a measuring tape pull tab, the tab is a metal strip fastened to the free end of the tape and bent to define a right angle. This in theory allows the user of the tape measure to hook the pull tab around an edge or insert it in a crevice, and then measure a distance longer than the outstretched arms of the user, without the need for a helper to hold the free end of the tape. The drawback of this system is that tension must be kept on the tape in order to insure that the pull tab stays in position at the corner or in the crevice. Additionally, this embodiment of pull tab is of no aid to facilitating one person use where there is not a corner or crevice at the end of an item to be measured.

In another embodiment of pull tab, the pull tab is formed from a wire or metal strip bent or stamped to define a circular, triangular or square ring tab. The ring tab may be hinged to the end of the measuring tape. Such a ring tab allows insertion of a projection, such as a nail or screw, through the tab, so that the user again can take a measurement longer than the length of his outstretched arms. With this embodiment, a projection must either exist at one end of the item to be measured, or must be fashioned, at the risk of marring the item's surface.

One permutation of the foregoing two basic embodiments, in lieu of bending a metal tab to define a right angle, is to substitute a hinge at the bend so that the free portion of the tab can be folded. Cleats are placed along the edges of the folding portion to improve its gripping power. Additionally, that portion of the tab fastened to the measuring tape can be fashioned to define an opening for insertion of a projection, as described above. However, even this variant still requires either a projection at one end of the item to be measured or a suitable corner at which or crevice in which the tab can be fixed.

SUMMARY OF THE INVENTION

A fastening device in one embodiment of the present fastening system comprises a tape pad comprising a support member and a plurality of leaves stacked together and affixed to the support member. A portion of at least one side of each leaf is covered with an adhesive material. The device further comprises a connecting member having a first free end and a second free end affixed to the backing material, and means for affixing the first free end of the connecting member to the free end of a tape measure.

In another embodiment of the present fastening system, a suction cup is used in lieu of the tape pad.

The present invention allows a tape measure to be used to measure distances greater than the span of the user's outstretched arms, without the need for a helper, and without the need for an edge, crevice or projection at one end of the item to be measured. Moreover, the present invention is useful in connection with surveyor's lines, plumb lines, or virtually any other elongate member that must have one end temporarily fixed to a surface to measure a length, assess an item's straightness or trueness, or perform a similar function.

BRIEF DESCRIPTION OF THE DRAWINGS

FIG. 1 shows a general view of the present measuring tape fastening system.

FIG. 2 is a detailed side view of the tape pad, showing the removal splints that separate the individual leaves comprising the tape pad.

FIG. 3A shows a fastening hook usable with one form of pull tab.

FIG. 3B shows a front and side view of another pull tab including an entry slot and ball recess for a ball type fastener, also shown in FIG. 3B.

FIG. 4 shows a sectional view of a suction cup fastener, usable in lieu of the tape pad shown in FIG. 1.

FIGS. 5A–5C show exhaust valves that can be used in connection with the suction cup of FIG. 4.

DESCRIPTION OF THE PREFERRED EMBODIMENTS

Figure 6A:
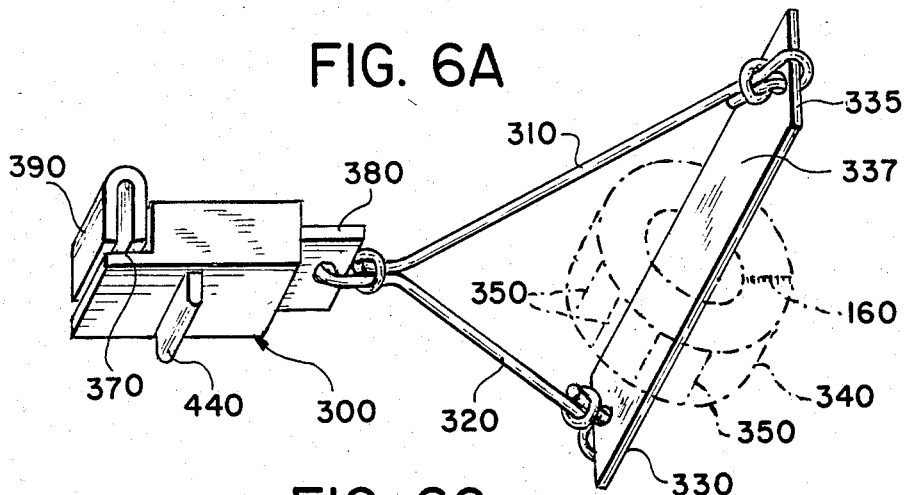
FIGS. 6A–6C show another embodiment of the present invention.

FIGS. 1 and 2 show tape pad 10 fastened to connecting member 20. Tape pad 10 comprises a support member, backing member 30, and a plurality of tape leaves 40, with connecting member 20 fastened to backing member 30. Tape leaves 40 are stacked together and the bottom leaf of the stack is affixed to backing member 30 with glue or other suitable fastening means. At least a portion of the side of each leaf facing away from backing member 30 is covered with an adhesive material. Free end 50 of connecting member 20 is adapted, as explained in greater detail below, to be removably secured to hinged pull tab 60 located at the free end of measuring tape 100.

To use this invention, the user first fastens connecting member 20 to the pull tab 60 of a measuring tape 100, and tape pad 60 is pressed against a surface from which a measurement is to be taken. Since at least a portion of the exposed leaf on pad 10 is covered with an adhesive, pad 10 will stick to the surface which it is pressed against. The user can then unwind the tape measure to a length greater than the span of his outstretched arms, thereby eliminating need for any helper to hold the pull tab while the measurement is being performed.

Connecting member 20 can be, for example, a metallic or plastic rod, braid or filament. It is connected to the support member, backing member 30, by means of a suitable fastener (not shown). The function of backing member 30 is to distribute the load from connecting member 20 to tape leaves 40. To allow measurement parallel to the surface on which tape pad 10 is pressed against, connecting member 20 can be made of a flexible material. Alternatively, a swivel (not shown) can be inserted between backing member 30 and connecting member 20 to accomplish the same result.

Free end 50 of connecting member 20 can be secured to a tape measure pull tab by means of a conventional snap fastener 25, such as that shown in FIG. 3A. This embodiment functions with a ring pull tab, or a hole can be provided in the pull tab at the free end of the tape measure, for insertion of snap fastener 25. Alternatively, free end 50 can terminate in a stopper ball 70 that is inserted in a ball recess 90 provided in ring pull tab 60. Specifically, FIG. 1 shows pull tab 60 fabricated with an entry slot 80, terminating at ball recess 90, and a position channel 85 communicating with entry slot 80 and ball recess 90. Slot 80 spans the entire thickness between the front and back faces of tab 60, whereas position channel 85 does not. Ball recess 90 is of a dimension such that stopper ball 70 can be positioned within it; in contrast, the width of each of slot 80 and channel 85 is greater than the diameter of connecting member 20, but less than the diameter of stopper ball 70. In use, connecting member 20 is threaded through entry slot 80 and urged away from tab 60 until stopper ball 70 is drawn into ball recess 90. Connecting member 20 is then shifted from entry slot 80 to position channel 85.

FIG. 3B shows a pull tab 110 bent to define a right angle and adapted to accept stopper ball 70 of connecting member 20. Specifically, free flange 120 of pull tab 110 includes a slot 130 and a ball recess 140. The width of slot 130 is slightly larger than the diameter of connecting member 20. The diameter of ball recess 140 is greater than the width of slot 130, but somewhat less than the diameter of stopper ball 70. Use requires insertion of connecting member 20 into ball recess 140 by passing it through slot 130. Connecting member 20 is then urged away from free flange 120, causing stopper ball 70 to be drawn against ball recess 140. Ball recess 140 can be chamfered, as shown in FIG. 3B, to facilitate retention of stopper ball 70 and ball recess 140.

The adhesive qualities of each exposed tape leaf of tape pad 10 will deteriorate after a number of applications. It is for this reason that tape pad 10 contains a plurality of tape leaves 40. A user can peel off a worn, exposed tape leaf 40 on pad 10 to expose a fresh, new tape leaf 40. To facilitate peeling, a plurality of removal splints 150 are included in tape pad 10. A removal splint 150 is placed between each tape leaf 40, to provide a space between each leaf 40 that aids peeling off the exposed leaf. As can be readily seen in FIGS. 1 and 2, it is preferred that removal splints 150 be staggered rather than placed in the same general location between each leaf 40 to minimize the bulge produced by splints 150 in tape pad 10.

When the tape measure is being used to measure a length normal to the surface to which tape pad 10 is affixed, the distance from the beginning of the tape measure to the exposed leaf of tape pad 10 must be added to the measurement read from the tape measure. Similarly, when the tape measure is being used to measure a length parallel to the surface to which tape pad 10 is affixed, the distance from the beginning of the tape measure to the point at which connecting member 20 joins backing member 30 must be added to the measured length. It is therefore preferred that the distance, from the beginning of the tape measure to the point at which connecting member 20 joins backing member 30, be an integral multiple of the unit measure used for tape measure 100. Thus, if the English measuring system is used for tape measure 100, it is preferred that this distance be 1 inch, 2 inches, etc. Similarly, if the metric system is used for tape measure 100, it is preferred that this distance be 1 centimeter, 2 centimeters, etc. This can be accomplished by suitably choosing the length of connecting member 20. In addition, since the thickness of tape pad 10 changes as leaves are removed, measurement graduations 160 are provided across the thickness of tape pad 10. These measurement graduations can be printed or embossed either directly on tape leaves 40 or on a fabric or plastic strip affixed to tape leaves 40, and should correspond to the units of measurement, be they metric, English or something else, used for the tape measure.

Suitable choice of the length of connecting member 20, as described above, and inclusion of graduations across the thickness of tape pad 10 facilitates measurement. If a measurement is being taken parallel to the surface against which tape pad 10 is pressed, the user simply can add to the measurement shown on the tape the known distance between the beginning of the tape measure and the point at which connecting member 20 joins backing member 30. That addition is made easier by the fact that that distance is some integral multiple of the unit length of the measurement system being used on the tape measure. If a length is being measured normal to the surface against which tape pad 10 is pressed, the user adds the known distance, between the beginning of the tape measure and the point at which connecting member 20 joins backing member 30, and the thickness of tape pad 10, as shown by graduations 160, to the measurement indicated on the tape measure. So that the length of connecting member 20 does not significantly change as a function of the tensile force applied to tape measure 100, connecting member 20 should be made of a substantially inelastic material.

Figure 6C:
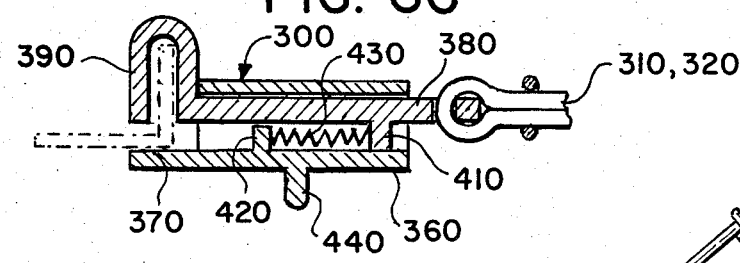
Figure 6B:
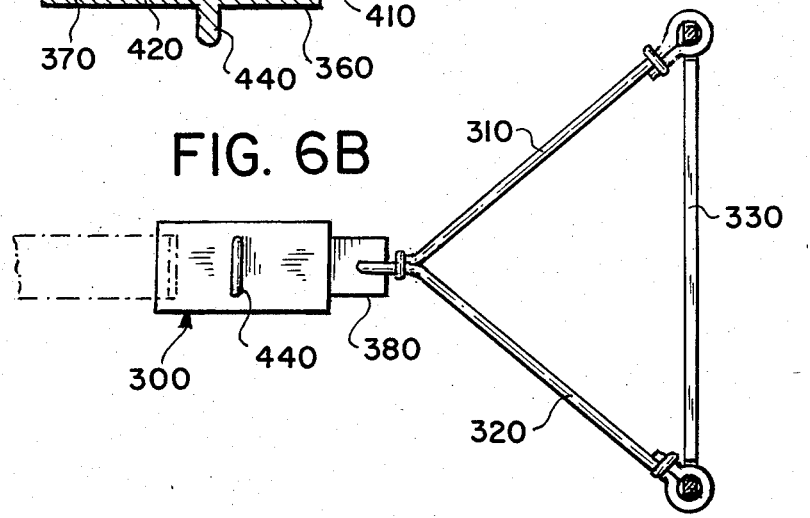

FIGS. 6A–6C show another embodiment of this invention. There is shown disconnect assembly 300, to which is secured a connecting member comprised of connecting arms 310 and 320. The ends of connecting arms 310 and 320 distal from disconnect assembly 300 are secured to the ends of tape support bar 330. Tape support bar 330 can be employed to retain one or more tape leaves 40, in lieu of backing member 30. Leaves 40 can be stacked together with the bottom leaf of the stack affixed to bottom face 335 of support bar 330. Alternatively, a single leaf, with adhesive covering one of its surfaces, can be applied to top face 337 of support bar 330, with its adhesive face in contact with top face 337. The leaf can extend over the edges of support bar 330 for fastening to a surface.

As another alternative, tape support bar 330 can support a tape roll 340, as shown by phantom lines in FIGS. 6A. Tape roll 340 differs from conventional tape rolls in that adhesive is applied to the outer face of the tape. Tape roll 340 can also include lines of perforation 350 to facilitate removal of discrete strips of tape. A roller (not shown) can be used in lieu of tape support bar 330. Such a roller is axially supported at each of its ends by connecting arms 310 and 320.

Disconnect assembly 300 comprises disconnect housing 360 in which engagement slide 380 is positioned. Spring 420 is positioned between engagement slide ledge 410, fixed to engagement slide 380, and housing ledge 420, fixed within disconnect housing 360. Spring 420 urges engagement hook 390, located at one end of engagement slide 380, over housing shield 370, a flat surface located within disconnect housing 360. Engagement tongue 450 of engagement slide 380 extends out beyond disconnect housing 360 and is connected to connecting arms 310 and 320.

Disconnect housing 360 allows use of the present invention with virtually any conventional measuring tape. By holding grasp arm 440, located on disconnect housing 360, and simultaneously pulling on engagement hook 390 (or simultaneously pushing on engagement tongue 450), engagement hook 390 can be slid out beyond housing shield 370. Whether the measuring tape has a hinged pull tab (such as tab 60 shown in FIG. 1), or a pull tab bent to define a right angle (such as shown in FIG. 3B), that tab can be inserted into engagement hook 390, as shown by the phantom lines in FIG. 6C. Grasp arm 440 can then be released, allowing spring 430 to urge engagement hook 390 over housing shield 370 and thus holding the pull tab firmly within disconnect assembly 300. Disconnect assembly 300 can be used with connecting member 20, shown in FIGS. 1 and 2, by connecting free end 50 of member 20 to engagement tongue 450.

It is also possible to use a suction cup in lieu of tape pad 10 or tape roll 340 for those surfaces to which adhesive tape will not readily adhere. Such a surface might be for example one that is wet or covered by oily substances. There is shown in FIG. 4 suction cup 170, fastened to connecting member 20. The user need only press suction cup 170 against a surface, to securely fix one end of tape measure to aid measuring.

The performance of suction cup 170 is significantly increased by the addition of an exhaust valve. FIGS. 5A-5C show various embodiments of suitable exhaust valves. FIG. 5A shows exhaust valve 200 located between suction cup 170 and connecting member 20. Exhaust valve 200 comprises casing 180, exit passage 190 and turnable ball 210. Connecting member 20 is attached to casing 180 by means of swaging, crimping or other suitable attachment scheme. Passage 190 connects the interior portion of suction cup 170 with the atmosphere. Passage 190 is closable via turnable ball 210.

A suction cup 170 employing the valve shown in FIG. 5A is used by first pressing suction cup 170 against the surface to which attachment is desired. This is done while turnable ball 210 is in the open position to allow air to pass via passage 190 from within the interior portion of suction cup 170 to the atmosphere. After suction cup 170 is fully depressed, ball 210 is changed to the closed position, thereby firmly anchoring suction cup 170 in place.

The exhaust valve shown in FIG. 5B is a check valve usable in lieu of the turnable ball valve shown in FIG. 5A. In FIG. 5B, ball 220 is urged against seat 230, located within casing 180, by spring 240. As yet another exhaust valve alternative, FIG. 5C shows a flap check valve 250 which can be located on suction cup 170 proximate to the point where connecting member 20 is fastened to suction cup 170. In using the embodiments of FIGS. 5B and 5C, the user need only press suction cup 170 against the surface to which fastening is desired, and the air within the suction cup passes out of the cup via passage 190. Suction cup 170 is thereafter firmly fastened to the surface.

While reference in the foregoing description of the preferred embodiments is to a tape measure, it should be kept in mind that this invention is applicable to any elongate member that must be temporarily fastened to a surface.

I claim:

1. A fastening device for temporarily securing an end of an elongate member at a fixed position, comprising:
   (a) a tape pad comprising:
      (i) a support member;
      (ii) a plurality of leaves, at least a portion of one side of each leaf being covered with an adhesive material to give each leaf an adhesive quality, the leaves stacked together to leave a first leaf exposed and affixed to the support member, so that the first leaf can be temporarily secured to a surface, and, if the adhesive quality of the first leaf deteriorates, the first leaf can be removed to expose a second leaf;
   (b) a connecting member having a first free end, and a second end fastened to the support member; and
   (c) means for affixing the first free end of the connecting member to a free end of the elongate member.

2. The fastening device as in claim 1, further comprising a removal splint between each leaf of the tape pad to facilitate peeling off of the leaves.

3. The fastening device as in claim 2, wherein the locations of the removal splints are staggered across the width of the tape pad.

4. The fastening device as in claim 1, wherein the length of the connecting member is chosen so that the distance from the beginning of an elongate member, used with the fastening device, to the point where the connecting member joins the support member, is an integral multiple of a unit length of measurement, and further comprising measurement graduations across the thickness of the tape pad.

5. The fastening device as in claim 1, wherein the connecting member is a flexible, substantially inelastic material.

6. The fastening device as in claim 1, wherein the means for affixing the first free end of the connecting member to a free end of an elongate member comprises:
   (a) a disconnect housing containing a housing shield;
   (b) an engagement slide having a first end terminating in an engagement hook and a second end attached to the free end of the connecting member, the engagement slide slidably positioned within the disconnect housing; and
   (c) means for biasing the engagement hook over the housing shield.

7. A measuring tape fastening system comprising:
   (a) a tape pad comprising:
      (i) a support member;
      (ii) a plurality of leaves, at least a portion of one side of each leaf being covered with an adhesive material, the leaves stacked together and affixed to the support member;
   (b) a connecting member having a first free end, and a second end affixed to the support member;
   (c) a stopper ball fastened to the first free end of the connecting member; and
   (d) a measuring tape with a free end terminating at a pull tab, the tab having an entry slot terminating in a ball recess;
   whereby the connecting member can be passed through the entry slot and urged away from the free end of the measuring tape, so as to draw the stopper ball against the ball recess.

8. The measuring tape fastening system as in claim 7, further comprising a position channel in the pull tab communicating with the entry slot end of the ball recess.

9. The measuring tape fastening system as in claim 7, further comprising a removal splint between each leaf of the tape pad to facilitate peeling off of the leaves.

10. The measuring tape fastening system as in claim 9, wherein the locations of the removal splints are staggered across the width of the tape pad.

11. The measuring tape fastening system as in claim 7, wherein the measuring tape is graduated with units of measurement, and the length of the connecting member is chosen so that the distance from the beginning of the tape measure to the point where the connecting member joins the support member is an integral multiple of the unit length of the units of measurement in which the measuring tape is graduated, and further comprising measurement graduations across the thickness of the tape pad.

12. The measuring tape fastening system as in claim 7, wherein the connecting member is a flexible, substantially inelastic material.

13. A measuring tape adapted for use with a fastening device having a tape pad and a connecting member, the tape pad including a support member and a plurality of leaves, at least a portion of one side of each leaf being covered with an adhesive material, the leaves being stacked and affixed to the support member, the connecting member having a first free end, and a second end affixed to the support member, with a stopper ball fastened to the first free end of the connecting member, the measuring tape comprising an elongate member having a pull tab at a free end of the tape, the pull tab having an entry slot terminating in a ball recess, whereby the connecting member can be passed through the entry slot and urged away from the free end of the measuring tape so as to draw the stopper ball against the ball recess.

14. A fastening device for temporarily securing an end of an elongate member at a fixed position, comprising:
 (a) a support member adapted to retain a tape roll;
 (b) a tape roll retained by the support member, and having adhesive applied to the outer face of the tape, wherein lines of perforation divide the roll into discrete, severable strips of tape, so that the adhesive imparts an adhesive quality to each severable strip, such that a first severable strip can be temporarily secured to a surface, and, if the adhesvie quality of that severable strip deteriorates, the first severable strip can be severed;
 (c) a connecting member having a first free end, and a second end fastened to the support member; and
 (d) means for affixing the first free end of the connecting member to a free end of the elongate member.

15. The fastening device as in claim 5, wherein the support member is a roller.

* * * * *